W. J. KENRICK.
AUTOMOBILE.
APPLICATION FILED JULY 10, 1916.
1,261,035.
Patented Apr. 2, 1918.
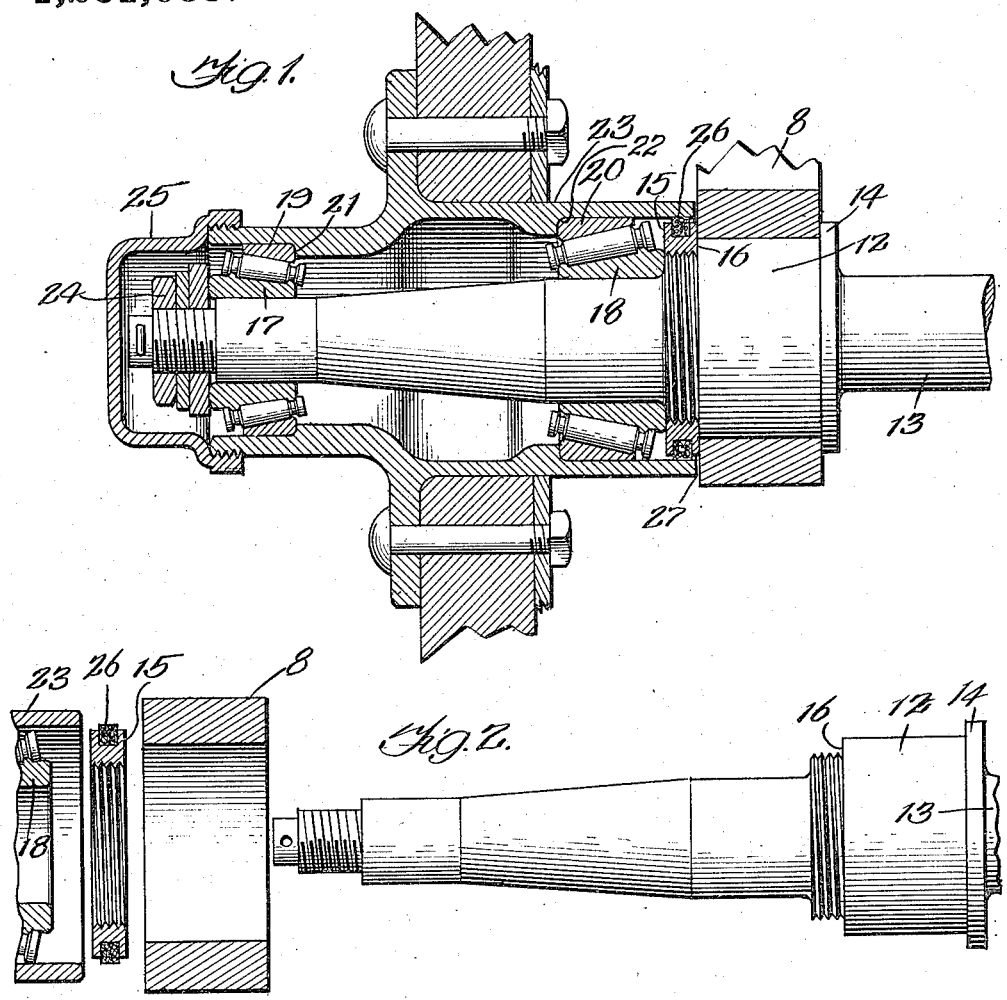
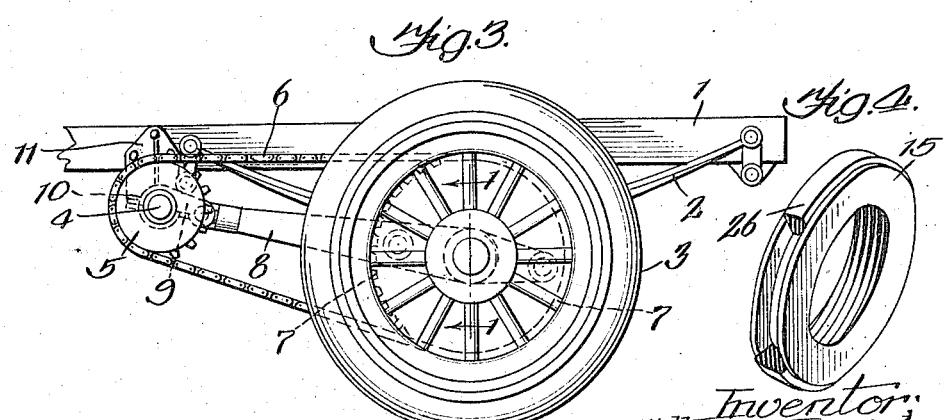
Inventor
William J Kenrick.

UNITED STATES PATENT OFFICE.

WILLIAM J. KENRICK, OF CHICAGO, ILLINOIS, ASSIGNOR TO DEARBORN MOTOR TRUCK COMPANY, OF CHICAGO, ILLINOIS, A CORPORATION OF ILLINOIS.

AUTOMOBILE.

1,261,035.  Specification of Letters Patent.  Patented Apr. 2, 1918.

Application filed July 10, 1916. Serial No. 108,357.

*To all whom it may concern:*

Be it known that I, WILLIAM J. KENRICK, citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

My invention relates to automobiles which include jack shafts in driving relation to propelling or driving vehicle wheels that are mounted upon dead axles and radius arms for maintaining a substantially fixed distance between the common axis of rotation of the driving vehicle wheels and the axis of the jack shaft. I employ means for maintaining the inner ends of the hubs of the driving vehicle wheels out of frictional engagement with the radius arms that are desirably pivotally mounted upon the dead axles near such hubs.

In the preferred embodiment of the invention roller bearings are disposed between both ends of each driving vehicle wheel hub and the contiguous end of the dead axle, the hubs being continued toward the radius arms and inclosing the roller bearings that are adjacent the radius arms. Collars are screwed upon the end portions of the dead axle and engage the radius arms to limit the extent to which they may shift toward the hubs, there being packing carried by these collars that engage the inner ends of the hubs to confine lubricant in the hubs and prevent access of dust thereto. The driving vehicle wheels are so located on the outer ends of the dead axle that the inner ends of their hubs are maintained out of frictional engagement with the radius arms pivoted upon the dead axle closely adjacent to said hubs.

I will explain my invention more fully by reference to the accompanying drawing showing the preferred embodiment thereof and in which Figure 1 is a sectional view of a part of the structure taken on line 1 1 of Fig. 3; Fig. 2 illustrates parts of the structure shown in Fig. 1 in separated relation; and Fig. 3 is a side view of enough of an automobile to illustrate my invention.

Like parts are indicated by similar characters of reference throughout the different figures.

The frame 1 of the automobile may be supported upon the vehicle wheels in any usual or preferred way, the rear part of such frame being supported by means of springs 2 upon the propelling or driving vehicle wheels 3. I have illustrated a jack shaft 4 driven by the power plant of the automobile and which jack shaft is mounted upon the under side of the frame. Power is communicated from the jack shaft by means of suitable gearing, there being preferably at each end of the jack shaft a sprocket pinion 5 in driving relation to a sprocket chain 6 which in turn drives a sprocket gear 7 in fixed relation to the contiguous driving vehicle wheel 3. A radius arm 8 is provided in connection with each driving vehicle wheel, this radius arm being pivotally connected at its forward end to brackets 9 that project from the hanger 10 for the corresponding end of the jack shaft. Each hanger 10 is carried by the frame 1 so that the forward ends of the radius arm are thereby connected with the frame. A shackle 11 for the spring 2 on each side of the automobile is also pivotally connected with a bracket extending from said hanger all as set forth and claimed in my co-pending application Serial No. 108,356, filed of even date herewith. The inner end of each radius arm is journaled upon an enlargement 12 of the dead axle 13, the space in which the radius arm may turn upon the dead axle being defined by a flange 14 at one end of the enlargement 12 and a collar 15 screwed upon the other end of this enlargement which is reduced to form a shoulder 16 against which the collar 15 abuts so that the width of the space that receives the radius arm is fixedly determined and which space is sufficiently large to permit the radius arm to oscillate upon the shaft enlargement 12 without having binding engagement with the flange 14 and collar 15. Each end of the dead axle 13 is continued outwardly beyond the enlargement 12 to afford supports for the inner raceways 17 and 18 of roller bearings, the rollers being desirably elongated to be substantially cylindrical, though the invention is not to be limited to the form of rollers or the type of bearings employed. The outer raceways 19 and 20 abut against shoulders 21 and 22 formed upon the interior of the tubular hub 23. The dead axle, the bearings, the hub, and the shoulders upon the hub are maintained in the relationship illustrated by means of the clamping nut 24 at the adjacent outer end of the axle. Each outer end of the dead axle is protected by means of a cap 25 that is threaded upon the outer end of the hub 23 while the inner end of the hub is closed by a dust guarding felt ring 26 that is received within the annular recess within the periphery of the collar 15 and which bears against the interior surface of the hub. Each outer end of the dead axle and the inner portion of the surrounding hub are so related that a slight clearance, illustrated at 27, is maintained between the inner end of the hub and the contiguous radius arm so as to avoid frictional engagement between the rotating hub and the oscillating radius arm.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. An automobile including the frame thereof; driving vehicle wheels supporting the frame; a dead axle upon which the driving vehicle wheels turn; a jack shaft in driving connection with the driving vehicle wheels; radius arms journaled upon the dead axle and pivotally connected at their forward ends with the frame; roller bearings between each driving vehicle wheel hub and the contiguous end of the dead axle, the hubs being continued toward the radius arms and inclosing the roller bearings adjacent the radius arms; collars screwed upon the end portions of the dead axle and engaging the radius arms; packing carried by the collars and engaging the inner ends of the hubs; and means for locating the driving vehicle wheels upon the outer ends of the dead axle that operate to maintain the inner ends of the hubs out of frictional engagement with the radius arms.

2. An automobile including the frame thereof; driving vehicle wheels supporting the frame; a dead axle upon which the driving vehicle wheels turn; a jack shaft in driving connection with the driving vehicle wheels; radius arms journaled upon the dead axle and pivotally connected at their forward ends with the frame; roller bearings between each driving vehicle wheel hub and the contiguous end of the dead axle, the hubs being continued toward the radius arms and inclosing the roller bearings adjacent the radius arms; collars screwed upon the end portions of the dead axle and engaging the radius arms; and means for locating the driving vehicle wheels upon the outer ends of the dead axle that operate to maintain the inner ends of the hubs out of frictional engagement with the reach rods.

3. An automobile including the frame thereof; driving vehicle wheels supporting the frame; a dead axle upon which the driving vehicle wheels turn; a jack shaft in driving connection with the driving vehicle wheels; radius arms journaled upon the dead axle and pivotally connected at their forward ends with the frame; bearings between each driving vehicle wheel hub and the contiguous end of the dead axle, the hubs being continued toward the radius arms and inclosing the bearings adjacent the radius arms; collars screwed upon the end portions of the dead axle and engaging the radius arms; and means for locating the driving vehicle wheels upon the outer ends of the dead axle that operate to maintain the inner ends of the hubs out of frictional engagement with the radius arms.

4. An automobile including the frame thereof; driving vehicle wheels supporting the frame; a dead axle upon which the driving vehicle wheels turn; a jack shaft in driving connection with the driving vehicle wheels; radius arms journaled upon the dead axle and pivotally connected at their forward ends with the frame; bearings between each driving vehicle wheel hub and the contiguous end of the dead axle; collars screwed upon the end portions of the dead axle and engaging the radius arms; and means for locating the driving vehicle wheels upon the outer ends of the dead axle that operate to maintain the inner ends of the hubs out of frictional engagement with the radius arms.

5. An automobile including the frame thereof; driving vehicle wheels supporting the frame; a dead axle upon which the driving vehicle wheels turn; a jack shaft in driving connection with the driving vehicle wheels; radius arms journaled upon the dead axle and pivotally connected at their forward ends with the frame; bearings between each driving vehicle wheel hub and the contiguous end of the dead axle; collars upon the end portions of the dead axle and engaging the radius arms; and means for locating the driving vehicle wheels upon the outer ends of the dead axle that operate to maintain the inner ends of the hubs out of frictional engagement with the radius arms.

In witness whereof, I hereunto subscribe my name this 13th day of June, A. D. 1916.

WILLIAM J. KENRICK.

Witnesses:
  G. L. CRAGG,
  E. L. WHITE.